(12) United States Patent
Takahashi et al.

(10) Patent No.: US 10,267,239 B2
(45) Date of Patent: Apr. 23, 2019

(54) INTERNAL-COMBUSTION ENGINE CONTROL DEVICE AND CONTROL METHOD

(75) Inventors: Eiji Takahashi, Isehara (JP); Shinobu Kamada, Yokohama (JP)

(73) Assignee: NISSAN MOTOR CO., LTD., Yokohama-shi, Kanagawa (JP)

(*) Notice: Subject to any disclaimer, the term of this patent is extended or adjusted under 35 U.S.C. 154(b) by 671 days.

(21) Appl. No.: 14/350,437

(22) PCT Filed: Sep. 4, 2012

(86) PCT No.: PCT/JP2012/072455
§ 371 (c)(1),
(2), (4) Date: Apr. 8, 2014

(87) PCT Pub. No.: WO2013/065397
PCT Pub. Date: May 10, 2013

(65) Prior Publication Data
US 2014/0261336 A1 Sep. 18, 2014

(30) Foreign Application Priority Data
Nov. 1, 2011 (JP) ................................. 2011-239903

(51) Int. Cl.
*F02B 75/26* (2006.01)
*F02D 15/00* (2006.01)
(Continued)

(52) U.S. Cl.
CPC ............. *F02D 15/00* (2013.01); *F02D 15/02* (2013.01); *F02D 23/00* (2013.01); *F02P 5/1504* (2013.01); *F02B 29/0406* (2013.01); *F02B 75/048* (2013.01); *F02D 41/0007* (2013.01); *F02D 41/10* (2013.01); *F02D 2200/0402* (2013.01); *F02D 2200/0414* (2013.01); *F02D 2200/0416* (2013.01); *F02P 5/1528* (2013.01); *Y02T 10/144* (2013.01); *Y02T 10/46* (2013.01)

(58) Field of Classification Search
USPC .................................... 123/48 R, 48 A, 48 B
See application file for complete search history.

(56) References Cited

U.S. PATENT DOCUMENTS

| | | | | | |
|---|---|---|---|---|---|
| 4,037,412 | A | * | 7/1977 | Jones | ...................... F02B 37/00 |
| | | | | | 123/206 |
| 4,474,008 | A | * | 10/1984 | Sakurai | ................... F02B 37/12 |
| | | | | | 123/568.27 |

(Continued)

FOREIGN PATENT DOCUMENTS

| | | |
|---|---|---|
| EP | 1380739 A1 | 1/2004 |
| JP | H02-163429 A | 6/1990 |

(Continued)

*Primary Examiner* — Lindsay Low
*Assistant Examiner* — Ruben Picon-Feliciano
(74) *Attorney, Agent, or Firm* — Drinker Biddle & Reath LLP

(57) ABSTRACT

It is an object to suppress turbo lag, while suppressing a decrease in torque in an acceleration-transient state to a supercharged state, occurring owing to a rise in required load. In a prescribed steady state, an engine compression ratio εm and ignition timing Tm are set so as to achieve a maximum thermal efficiency. In contrast, in a transient state from a non-supercharged state to a supercharged state, occurring owing to a rise in required load, the engine compression ratio is corrected to a higher compression ratio εh and concurrently the ignition timing is corrected to a retarded timing value Th, in comparison with the engine compression ratio εm and the ignition timing Tm during steady-state operation for the same load, thereby increasing exhaust energy due to a reduction in cooling loss and consequently suppressing a delay of response to a rise in supercharging pressure.

18 Claims, 5 Drawing Sheets

(51) Int. Cl.
*F02D 15/02* (2006.01)
*F02D 23/00* (2006.01)
*F02P 5/15* (2006.01)
F02B 29/04 (2006.01)
F02D 41/10 (2006.01)
F02P 5/152 (2006.01)
F02D 41/00 (2006.01)
F02B 75/04 (2006.01)

(56) References Cited

U.S. PATENT DOCUMENTS

| | | | | |
|---|---|---|---|---|
| 5,819,702 A * | 10/1998 | Mendler | ............... | F02B 41/00 |
| | | | | 123/1 R |
| 7,627,417 B2 | 12/2009 | Akihisa et al. | | |
| 2005/0056240 A1 * | 3/2005 | Sugiyama | ............ | F02B 75/045 |
| | | | | 123/78 E |
| 2008/0190406 A1 * | 8/2008 | Akihisa | ................. | F02D 15/04 |
| | | | | 123/78 C |

FOREIGN PATENT DOCUMENTS

| | | | |
|---|---|---|---|
| JP | 2002-070601 A | 3/2002 |
| JP | 2004-092639 A | 3/2004 |
| JP | 2004-507651 A | 3/2004 |
| JP | 2005-069130 A | 3/2005 |
| JP | 2009-275687 A | 11/2009 |
| JP | 4415464 B2 | 2/2010 |
| JP | 4497018 B2 | 7/2010 |
| WO | WO 2006/112256 A1 | 10/2006 |

* cited by examiner

INTERNAL-COMBUSTION ENGINE CONTROL DEVICE AND CONTROL METHOD

TECHNICAL FIELD

The present invention relates to the control of a spark-ignited internal combustion engine equipped with a turbo supercharger (a turbocharger) driven by exhaust gas and capable of changing an engine compression ratio.

BACKGROUND ART

As is generally known, in the case of a turbocharger driven by exhaust gas of an internal combustion engine, a delay of response to a rise in supercharging pressure, commonly called "turbo lag" takes place in an acceleration-transient state from a non-supercharged state to a supercharged state, on an acceleration condition accompanying a rise in required load for the internal combustion engine. Patent document 1 discloses a technology in which a turbo lag is suppressed by the use of a compression ratio changing mechanism that can change an engine compression ratio. In the above-mentioned document, in the presence of an acceleration requirement that the influence of a turbo lag becomes remarkable, the compression ratio is changed to a compression ratio lower than a reference compression ratio at which a prescribed thermal efficiency can be achieved, thereby increasing exhaust energy and consequently suppressing the turbo lag.

On the other hand, Patent document 2 discloses a technology in which an engine compression ratio is set to raise a thermal efficiency as much as possible during a time period that a turbo lag may occur, and therefore torque is increased even in a transient state wherein the turbo lag occurs.

CITATION LIST

Patent Literature

Patent document 1: Japanese patent No. 4497018 (B2)
Patent document 2: Japanese patent No. 4415464 (B2)

SUMMARY OF INVENTION

Technical Problem

However, as disclosed in the above-mentioned Patent document 1, when the engine compression ratio is reduced in the acceleration-transient state, torque tends to decrease due to a deterioration in thermal efficiency, and thus the acceleration responsiveness also tends to degrade. Also, as disclosed in the above-mentioned Patent document 2, in the case of the engine-compression-ratio setting by which the thermal efficiency is raised as much as possible in the acceleration-transient state, there is a problem that the turbo lag itself becomes longer due to a decrease in exhaust energy.

Solution to Problem

It is, therefore, in view of the previously-described drawbacks of the prior art, the present invention is characterized in that, in a prescribed steady state, an engine compression ratio and ignition timing are controlled so as to achieve a high thermal efficiency, and that, in a transient state from a non-supercharged state to a supercharged state, occurring owing to a rise in required load, the engine compression ratio is increased and concurrently the ignition timing is retarded, with respect to the engine compression ratio and ignition timing both set in the aforementioned steady state.

Advantageous Effects of Invention

According to the invention, it is possible to suppress a delay of response to a rise in supercharging pressure, commonly called "turbo lag", while suppressing a decrease in torque occurring in a transient state from a non-supercharged state to a supercharged state, occurring owing to a rise in required load.

DESCRIPTION OF EMBODIMENTS

Figure 3:
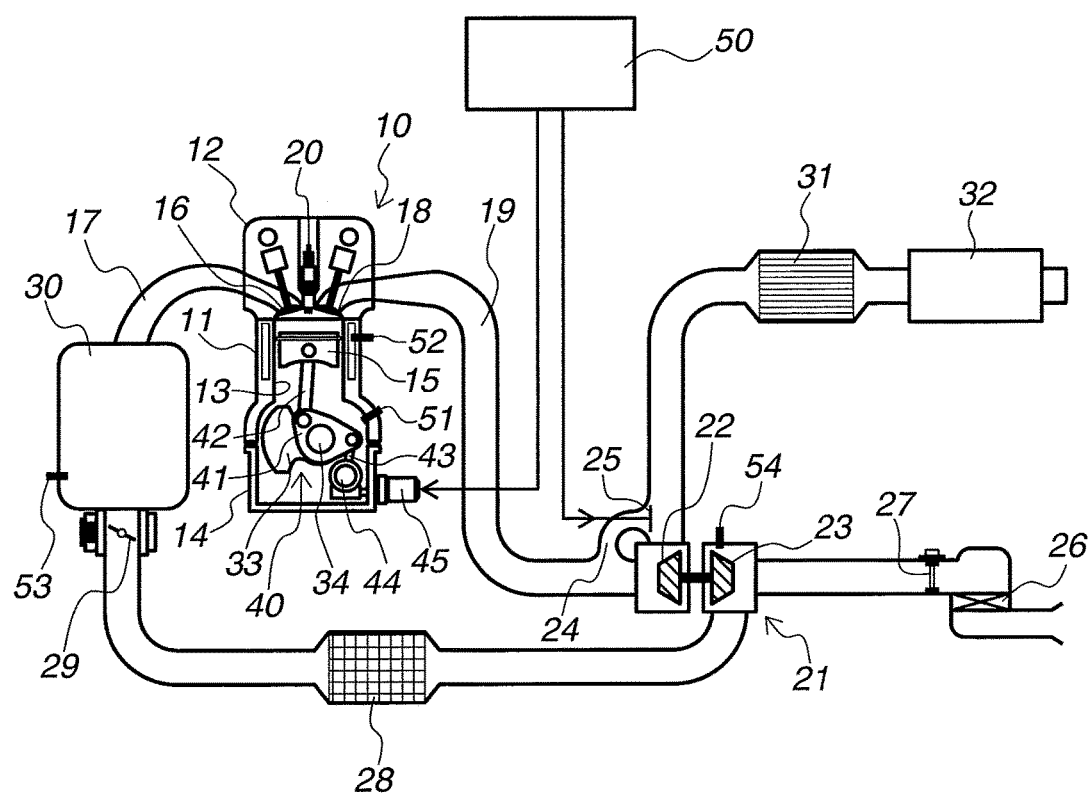
FIG. 3 is a block diagram illustrating an internal-combustion engine control device to which one embodiment of the invention can be applied.

Preferred embodiments of the invention are hereinafter described in reference to the drawings. FIG. 3 shows the system configuration of a spark-ignited internal combustion engine to which the embodiment can be applied. An internal combustion engine 10 has a cylinder block 11 formed with a plurality of cylinders 13, a cylinder head 12 fixedly connected onto the upside of cylinder block 11, and an oil pan 14 fixedly connected to the underside of cylinder block 11. By the way, in this figure, only one engine cylinder 13 is shown, but actually a plurality of engine cylinders 13 are juxtaposed to each other in the cylinder-row direction.

Pistons 15 are slidably installed in respective cylinders 13. A combustion chamber is defined between the upside of each piston 15 and the underside of the pent-roof type cylinder head 12. An intake passage (an intake port) 17 is connected to each combustion chamber through an intake valve 16. An exhaust passage (an exhaust port) 19 is also connected to each of the combustion chambers through an exhaust valve 18. Furthermore, a spark plug 20, serving as an ignition device, is installed at the center of the top of the combustion chamber for spark-igniting a mixture (an air-fuel mixture).

Internal combustion engine 10 is also equipped with a turbocharger 21 driven by exhaust energy for supercharging intake air. Turbocharger 21 has a turbine 22 installed in the exhaust passage 19 and driven by exhaust gas, a compressor 23 installed in the intake passage 17 for supercharging intake air (intake gas), and an exhaust bypass valve 25. The turbine and the compressor are arranged coaxially with each other. In order to control supercharging pressure depending on an operating condition, the exhaust bypass valve is provided in a bypass passage 24 for bypassing part of exhaust gas from the upstream side of turbine 22.

From the upstream side of intake passage 17, an air filter 26, an airflow meter 27, the compressor 23, an intercooler 28, and an electronically-controlled throttle valve 29 are installed in the intake passage, in that order. The air filter is provided for trapping or collecting debris and impurities in the intake air. The airflow meter is provided for detecting the amount of intake air. The intercooler is provided for cooling the supercharged air. The electronically-controlled throttle valve is arranged upstream of an intake collector 30 for adjusting the amount of intake air. Although it is not shown in the drawings, a fuel injection valve is provided for injecting fuel toward the intake port or the combustion chamber of each cylinder.

A catalyst 31, such as a three way catalyst or the like, is interposed in the exhaust passage 19. A noise-suppression muffler 32 is installed on the downstream side of catalyst 31.

Furthermore, as a variable compression ratio means for changing an engine compression ratio (hereinafter simply referred to as "compression ratio") of internal combustion engine 10, a variable compression ratio mechanism 40, which utilizes a multi-link piston-crank mechanism, is provided. The variable compression ratio mechanism 40, as disclosed in Japanese patent No. 4415464 (B2), is publicly known, and thus its construction is hereunder described briefly. The variable compression ratio mechanism has a lower link 41 rotatably installed on a crankpin 34 of a crankshaft 33, an upper link 42 that connects the lower link 41 with the piston 15, and a control link 43 whose one end is connected to the lower link 41. The other end of control link 43 is pivotably installed on an eccentric shaft, which is fixed onto a control shaft 44 and whose geometric center is eccentric to the axis of rotation of the control shaft. Hence, the attitude of lower link 41 changes through the control link 43 by changing the angular position of control shaft 44 by means of a variable compression ratio actuator 45, such as a motor, and thus it is possible to change the compression ratio with a change in piston stroke characteristic.

An ECU (an engine control unit) 50, which serves as a control part, has a function that stores and carries out various control processes. On the basis of engine operating conditions, detected or estimated by a variety of sensors, the ECU is configured to output respective control signals to the fuel injection valves, spark plug 20, throttle valve 29, exhaust bypass valve 25, variable compression ratio actuator 45 and the like, for controlling a fuel-injection quantity and fuel injection timing, ignition timing, a throttle opening (an intake-air quantity), supercharging pressure, a compression ratio, and the like. As the previously-discussed various sensors, an engine rotational speed sensor 51 for detecting an engine rotational speed and a coolant temperature sensor 52 for detecting an engine temperature such as an engine coolant temperature are installed on the cylinder block 11, whereas an intake air sensor 53 for detecting both an intake-air temperature and intake pressure is installed on the intake collector 30. A turbo rotational speed sensor 54 is also provided for detecting a turbo rotational speed corresponding to a rotational speed of the turbine 22 of turbocharger 21. Also provided is an accelerator pedal sensor 55 (see FIG. 4) for detecting the opening of an accelerator pedal operated by the driver.

Figure 4:
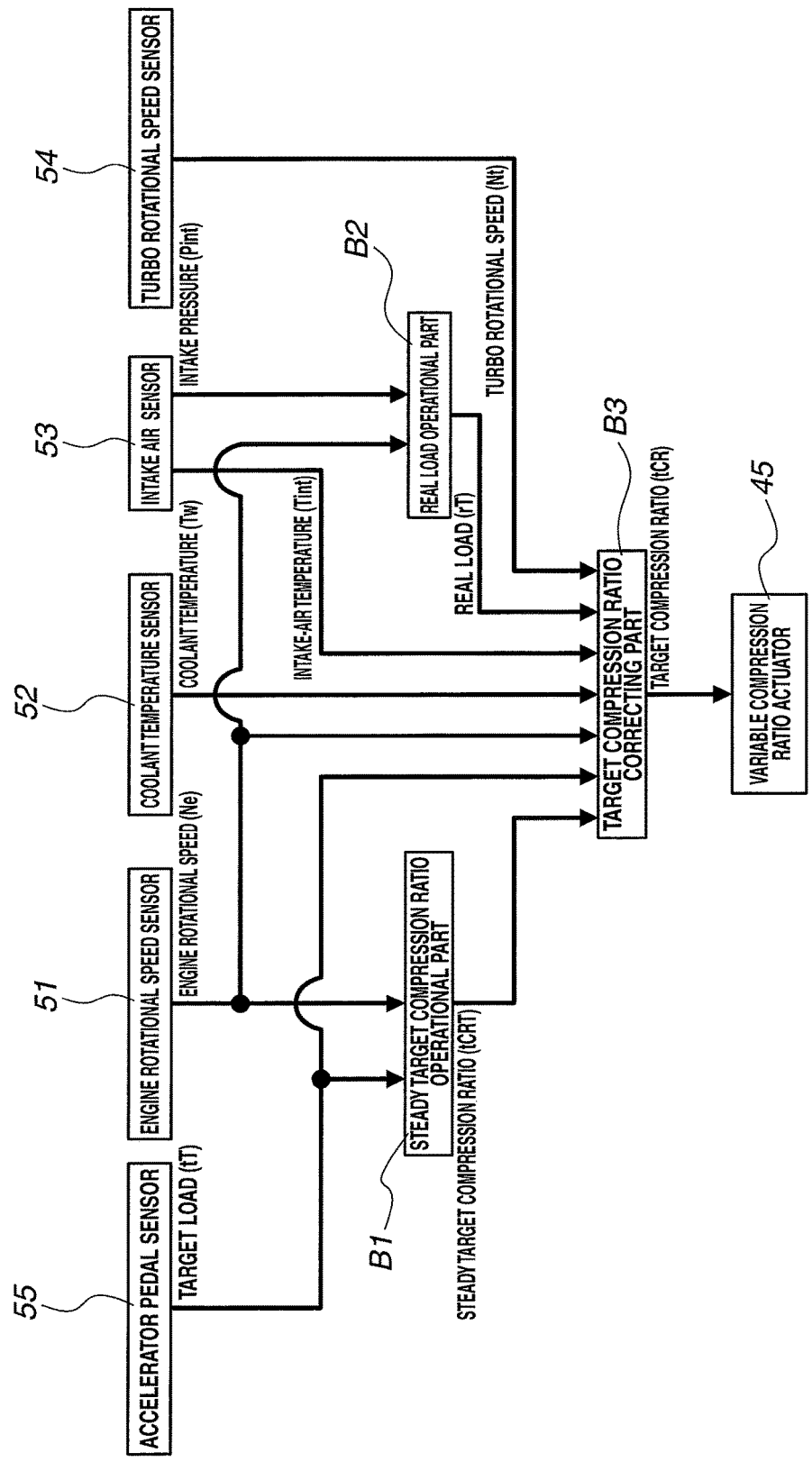
FIG. 4 is a simplified control block diagram illustrating control processing executed by the control device of the embodiment.

FIG. 4 is the control block diagram simply showing the control processes stored and executed within the ECU 50. A steady target compression ratio operational part B1 calculates, based on a target load (a required load) tT and the engine rotational speed Ne detected by the engine rotational speed sensor 51, a steady target compression ratio tCRT corresponding to a target compression ratio in the prescribed steady state, and sends the calculated result to a target compression ratio correcting part B3. Target load tT is set based on the accelerator opening detected by the accelerator pedal sensor 55. A real load operational part B2 estimates or calculates a real load rT of the internal combustion engine based on the engine rotational speed Ne and the intake pressure Pint, and sends the calculated result to the target compression ratio correcting part B3. Target compression ratio correcting part B3 corrects the steady target compression ratio tCRT based on the target load tT, the engine rotational speed Ne, the coolant temperature Tw, the intake-air temperature Tint, the real load rT, and the turbo rotational speed Nt, and finally calculates a target compression ratio tCR, and sends the calculated result (the calculated output signal) to the variable compression ratio actuator 45. By means of the variable compression ratio actuator 45, variable compression ratio mechanism 40 is driven and controlled closer to the target compression ratio tCR. As described later, within the target compression ratio correcting part B3, in an acceleration-transient state from a non-supercharged state to a supercharged state, occurring depending on a rise in target load tT, the target compression ratio tCR is corrected to a higher compression ratio with respect to the steady target compression ratio tCRT, and the ignition timing is corrected to a retarded timing value concurrently with the correction made to the compression ratio.

Figure 5:
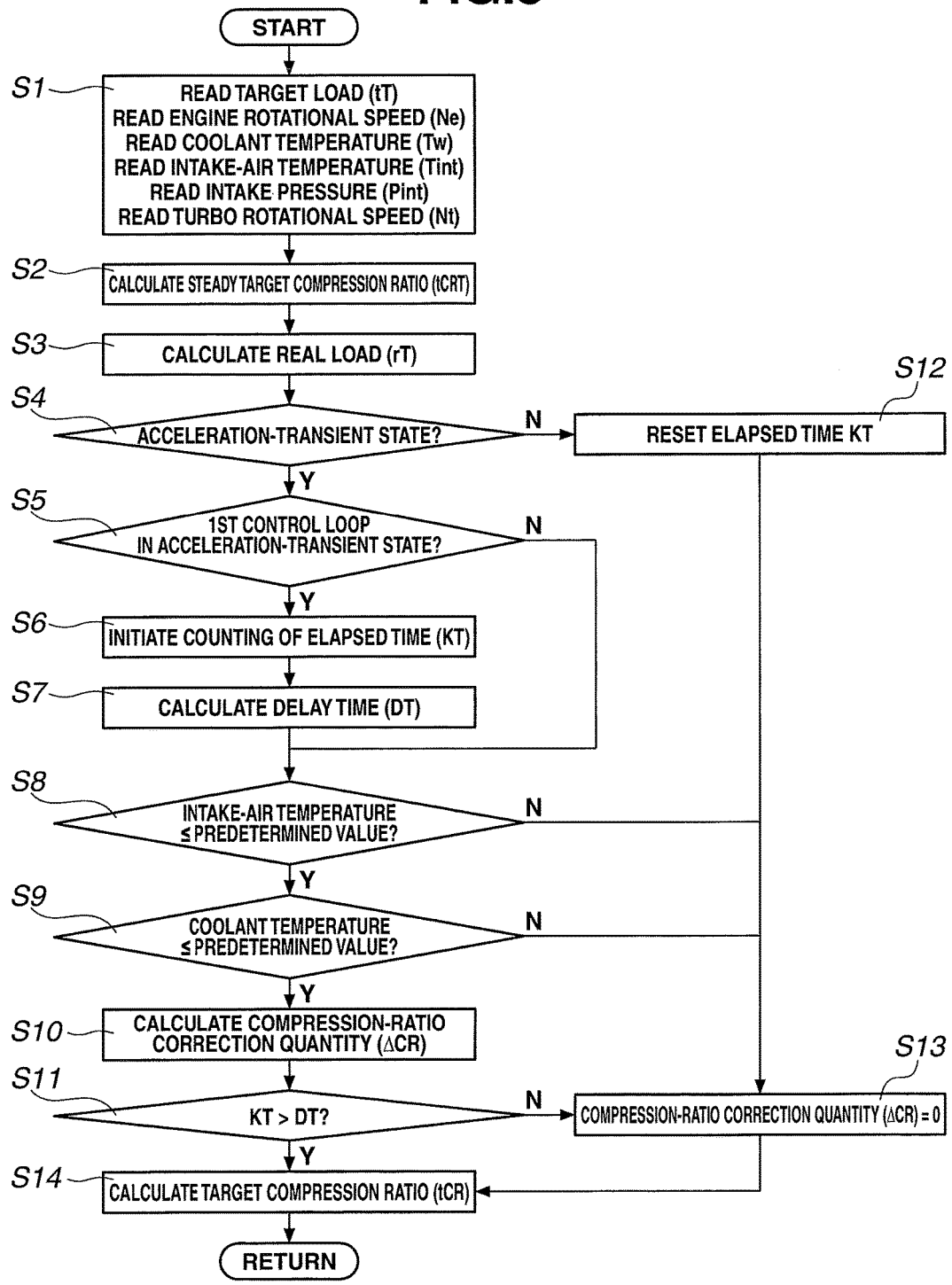
FIG. 5 is a flowchart illustrating the control flow in the embodiment.

FIG. 5 is the flowchart illustrating the control flow in the embodiment. The routine is repeatedly executed as time-triggered interrupt routines to be triggered every predetermined time intervals such as 10 msec.

At step S1, from sensor outputs of the previously-discussed various sensors, target load tT, engine rotational speed Ne, coolant temperature Tw, intake-air temperature Tint, intake pressure Pint, and turbo rotational speed Nt are read. Then, the routine proceeds to step S2. At step S2, steady target compression ratio tCRT is calculated based on the target load tT and the engine rotational speed Ne, and then the routine proceeds to step S3. Concretely, a corresponding steady target compression ratio is retrieved or looked up from a predetermined control map in which steady target compression ratio tCRT is stored in correlation with target load tT and engine rotational speed Ne.

At step S3, real load rT of the internal combustion engine is calculated based on the engine rotational speed Ne and the intake pressure Pint, and then the routine proceeds to step S4. At step S4, a check is made to determine whether the engine is in an acceleration-transient state from a non-supercharged state to a supercharged state, occurring owing to a rise in target load tT. Concretely, when a finite difference $\Delta T$ ($=tT-rT$) between target load tT and real load rT is greater than or equal to a predetermined value, it is determined that the engine is in the acceleration-transient state, and then the routine proceeds to step S5. Conversely when the finite difference is less than the predetermined value, it is determined that the engine is out of the acceleration-transient state, and then the routine proceeds to step S12.

At step S5, a check is made to determine whether the current loop is the first control loop after a transition to the acceleration-transient state, that is, the present time corresponds to an acceleration start point t0 (see FIG. 6) from the non-supercharged state to the supercharged state. In the case of the first control loop, the routine proceeds to step S6. Conversely in the case of the control loop after the second control loop, the routine proceeds to step S8. At step S6, counting of the time KT elapsed from the acceleration start point t0 is initiated, and then the routine proceeds to step S7. At step S7, a delay time DT before correction processing (described later) that increases the compression ratio higher than that of the steady state is calculated based on the engine rotational speed Ne. Then, the routine proceeds to step S8. The delay time DT corresponds to a delay period from the acceleration start point t0 to a point of time t1 (see FIG. 6) at which the correction processing to the high-compression-ratio side is initiated. The delay time is retrieved or derived from a preset or pre-stored engine-rotational-speed Ne versus delay time function or map such that the delay time decreases as the engine rotational speed Ne increases.

At step S8, a check is made to determine whether intake-air temperature Tint is lower than or equal to a predetermined value. In the case of the intake-air temperature lower than or equal to the predetermined value, the routine proceeds to step S9. Conversely in the case of the intake-air temperature higher than the predetermined value, the routine proceeds to step S13. At step S9, a check is made to determine whether coolant temperature Tw is lower than or equal to a predetermined value. In the case of the coolant temperature lower than or equal to the predetermined value, the routine proceeds to step S10. Conversely in the case of the coolant temperature higher than the predetermined value, the routine proceeds to step S13. At step S10, a compression-ratio correction quantity $\Delta CR$, corresponding to an increment in compression ratio with respect to the steady target compression ratio tCRT, is calculated based on the engine rotational speed Ne, the turbo rotational speed Nt, the target load tT, and the real load rT, and then the routine proceeds to step S11. Concretely, the compression-ratio correction quantity $\Delta CR$ is calculated by retrieving or looking up a corresponding compression-ratio correction quantity from a predetermined control map in which compression-ratio correction quantity $\Delta CR$ is stored in correlation with engine rotational speed Ne, turbo rotational speed Nt, and finite difference $\Delta T$ between the target load and the real load. The compression-ratio correction quantity is set such that compression-ratio correction quantity $\Delta CR$ increases as the engine rotational speed Ne decreases, the turbo rotational speed Nt decreases, and/or the infinite difference $\Delta T$ increases.

At step S11, a check is made to determine whether the elapsed time KT is greater than the delay time DT. When the elapsed time KT is greater than the delay time DT, the routine proceeds to step S14. Conversely when the elapsed time KT is less than the delay time DT, the routine proceeds to step S13. At step S12, the elapsed time KT is reset to "0", and then the routine proceeds to step S13. At step S13, compression-ratio correction quantity $\Delta CR$ is set to "0", and then the routine proceeds to step S14. At step S14, target compression ratio tCR is calculated based on the steady target compression ratio tCRT and the compression-ratio correction quantity $\Delta CR$. That is, in the acceleration-transient state, target compression ratio tCR is calculated by adding the compression-ratio correction quantity $\Delta CR$ to the steady target compression ratio tCRT. In contrast, in the steady state, the routine proceeds from step S4 via step S12 to step S13, such that the steady target compression ratio tCRT itself is set as the target compression ratio tCR (=tCRT) without correcting the steady target compression ratio. Ignition timing is set depending on the target compression ratio tCR calculated and set as set forth above.

Figure 1:
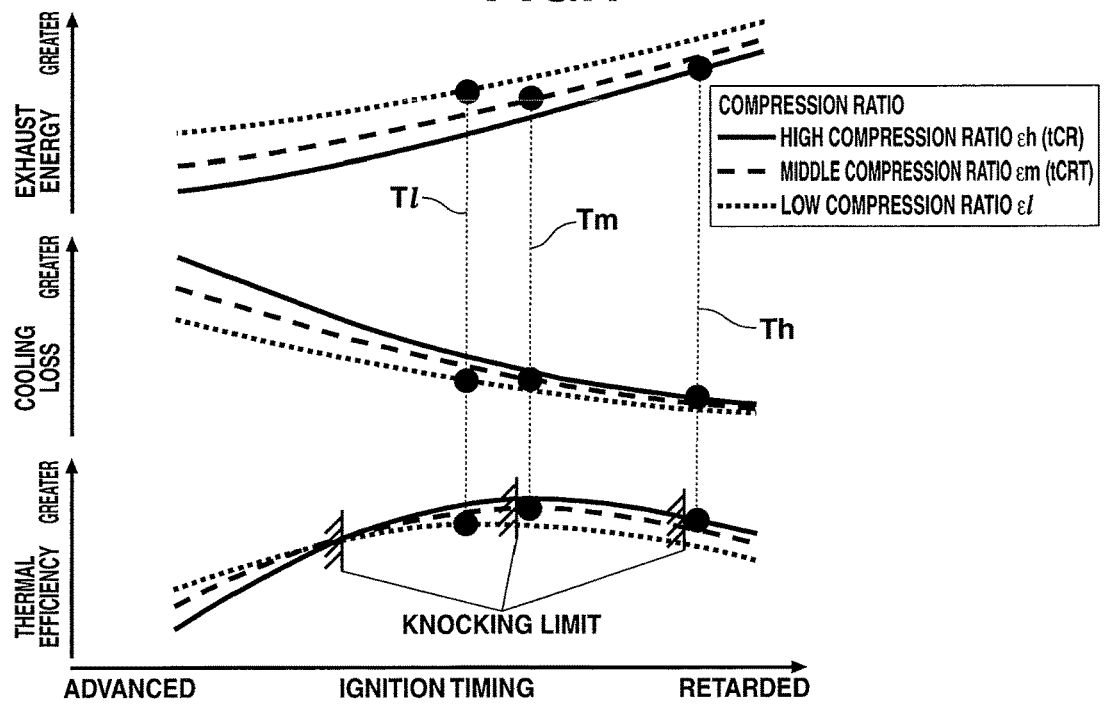
FIG. 1 is an explanatory view illustrating the relationship among a thermal efficiency, a cooling loss, and an exhaust energy, with respect to various settings of engine compression ratio and ignition timing.
Figure 2:
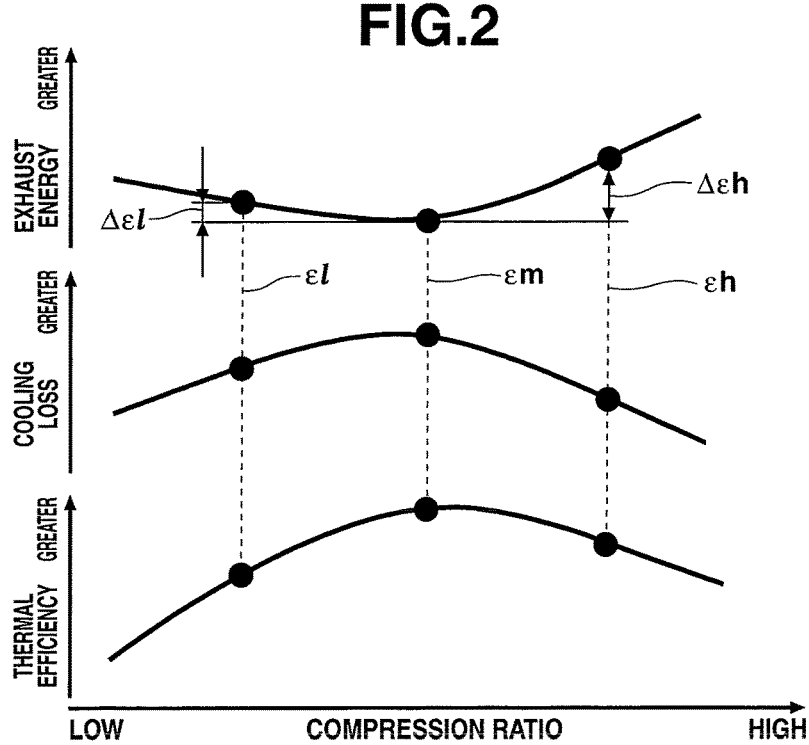
FIG. 2 is an explanatory view illustrating the relationship among a thermal efficiency, a cooling loss, and an exhaust energy, with respect to various settings of engine compression ratio and ignition timing similar to FIG. 1.

The concrete correction processing of compression ratio and ignition timing in an acceleration-transient state, corresponding to the essential part of the embodiment, that is, the target compression ratio correcting part B3 of FIG. 4 and the correction processing executed at steps S10 and S14 in FIG. 5 are hereunder described in reference to FIGS. 1 and 2.

Like the previously-discussed embodiment, in a spark-ignited internal combustion engine equipped with a variable compression ratio means for changing an engine compression ratio depending on an engine operating condition, it is possible to improve fuel economy and enhance an output performance by setting the compression ratio so as to raise a thermal efficiency as much as possible in a steady state.

On one hand, in the case that a variable compression ratio means is combined with a non-turbocharger equipped naturally-aspirated spark-ignited internal combustion engine, even in an acceleration-transient state accompanying a rise in required load, it is possible to improve fuel economy and enhance an output performance by controlling a compression ratio so as to raise a thermal efficiency as much as possible depending on an intake-air quantity, in a similar manner to a steady state. On the other hand, in the case that a variable compression ratio means is combined with a spark-ignited internal combustion engine equipped with a turbocharger driven by exhaust energy for supercharging intake air, assume that in an acceleration-transient state from a non-supercharged state to a supercharged state the compression ratio and ignition timing are set to simply raise a thermal efficiency in a similar manner to a steady state. In such a case, due to the raised thermal-efficiency the exhaust energy tends to reduce, and as a result a delay of response to a rise in supercharging pressure, that is, an increase in turbo lag takes place.

As a countermeasure against the task as previously discussed, in the embodiment, in an acceleration-transient state from a non-supercharged state to a supercharged state, occurring owing to a rise in required load, the compression ratio is corrected to a higher compression ratio with respect to the steady-state compression ratio and concurrently the ignition timing is corrected to a retarded timing value with respect to the steady-state ignition timing. That is to say, in the presence of a rise in required load from a non-supercharged state to a supercharged state, during transient-state operation in which the real load and torque of the internal combustion engine are increasing, the compression ratio is increased and concurrently the ignition timing is retarded, in comparison with during steady-state operation for the same load. Hence, a slight drop in thermal efficiency occurs but a cooling loss reduces, as compared to the previously-discussed setting of compression ratio and ignition timing by which the thermal efficiency is simply raised. Accordingly, such a reduction in cooling loss can be converted to an increase in exhaust energy, and thus it is possible to effectively suppress and shorten the turbo lag in the transient state, while suppressing a decrease in torque.

Referring to FIG. 1, there is shown the relationship among a thermal efficiency, a cooling loss, and an exhaust energy, with respect to settings of engine compression ratio and ignition timing, under a given load (a given intake-air quantity). In the drawing, a middle compression ratio $\varepsilon m$ and ignition timing Tm are a combination of compression ratio and ignition timing by which the highest thermal efficiency can be obtained during operation under the given load, and correspond to target values in a steady state. That is, the middle compression ratio $\varepsilon m$ corresponds to the steady target compression ratio tCRT in the previously-discussed embodiment. At this time, the ignition timing Tm is set close to a knocking limit. In contrast, in the case of the low-compression-ratio setting to a low compression ratio $\varepsilon l$ lower than the middle compression ratio $\varepsilon m$, due to a reduction in compression ratio the knocking limit tends to greatly advance. Thus, ignition timing Tl is set close to the minimum advance for the best torque (MBT), corresponding to a timing advanced side as compared to the ignition timing Tm at the middle compression ratio εm. Therefore, in the case of the combination of low compression ratio εl and ignition timing Tl, a reduction in cooling loss occurring owing to a reduction in compression ratio and an increase in cooling loss occurring owing to the ignition-timing advance (i.e., an increase in real time of combustion) combine together to produce a slight reduction in cooling loss, in comparison with the combination of middle compression ratio εm and ignition timing Tm. Hence, the exhaust energy tends to slightly increase by an increment Δεl as a result of such a slight reduction in cooling loss combined with a drop in thermal efficiency.

A high compression ratio εh and ignition timing Th are a suitable combination used as target values in an acceleration-transient state from a non-supercharged state to a supercharged state, occurring owing to a rise in required load. The compression ratio is set higher and the ignition timing is a retarded timing value, as compared to the combination of middle compression ratio εm and ignition timing Tm in the steady state. That is, high compression ratio εh corresponds to the target compression ratio tCR (=tCRT+ΔCR) corrected in the acceleration-transient state in the previously-discussed embodiment.

In the case of high-compression-ratio εh setting, due to an increase in compression ratio the knocking limit retards, and due to a retardation in knocking limit the ignition timing Th tends to greatly retard as compared to the position (in close proximity to ignition timing Tm) at which the thermal efficiency becomes maximum. As a result of this, the thermal efficiency tends to slightly drop in comparison with the setting in the steady state. Additionally, in the case of high-compression-ratio εh setting, in a similar manner to middle-compression-ratio εm setting the engine is operating near the knocking limit, and thus the compression ratio for the combustion timing becomes somewhat low, when taking account of the influence of compression history to knocking. Additionally, the ignition timing is retarded, and hence the real time of combustion becomes short and therefore the cooling loss greatly reduces. Such a great reduction in cooling loss can be allocated to the thermal efficiency and the exhaust loss. Accordingly, in the case of the setting of high compression ratio εh and ignition timing Th, it is possible to greatly increase the exhaust energy by increasing the compression ratio and concurrently retarding the ignition timing, in comparison with the setting of middle compression ratio εm and ignition timing Tm in the steady state, and therefore a sufficient turbo-lag reducing and shortening effect can be provided.

FIG. 2 is the diagram that ignition timing of the abscissa of FIG. 1 is replaced with a compression ratio, and ignition-timing settings at respective compression ratios are similar to FIG. 1. As seen in FIG. 2, as compared to low-compression-ratio εl setting by which the compression ratio becomes low, in the case of high-compression-ratio εh setting by which the compression ratio becomes high, it is possible to increase an increment of exhaust energy (Δεh>Δεl) with respect to middle-compression-ratio εm setting by which the thermal efficiency becomes maximum.

Figure 6:
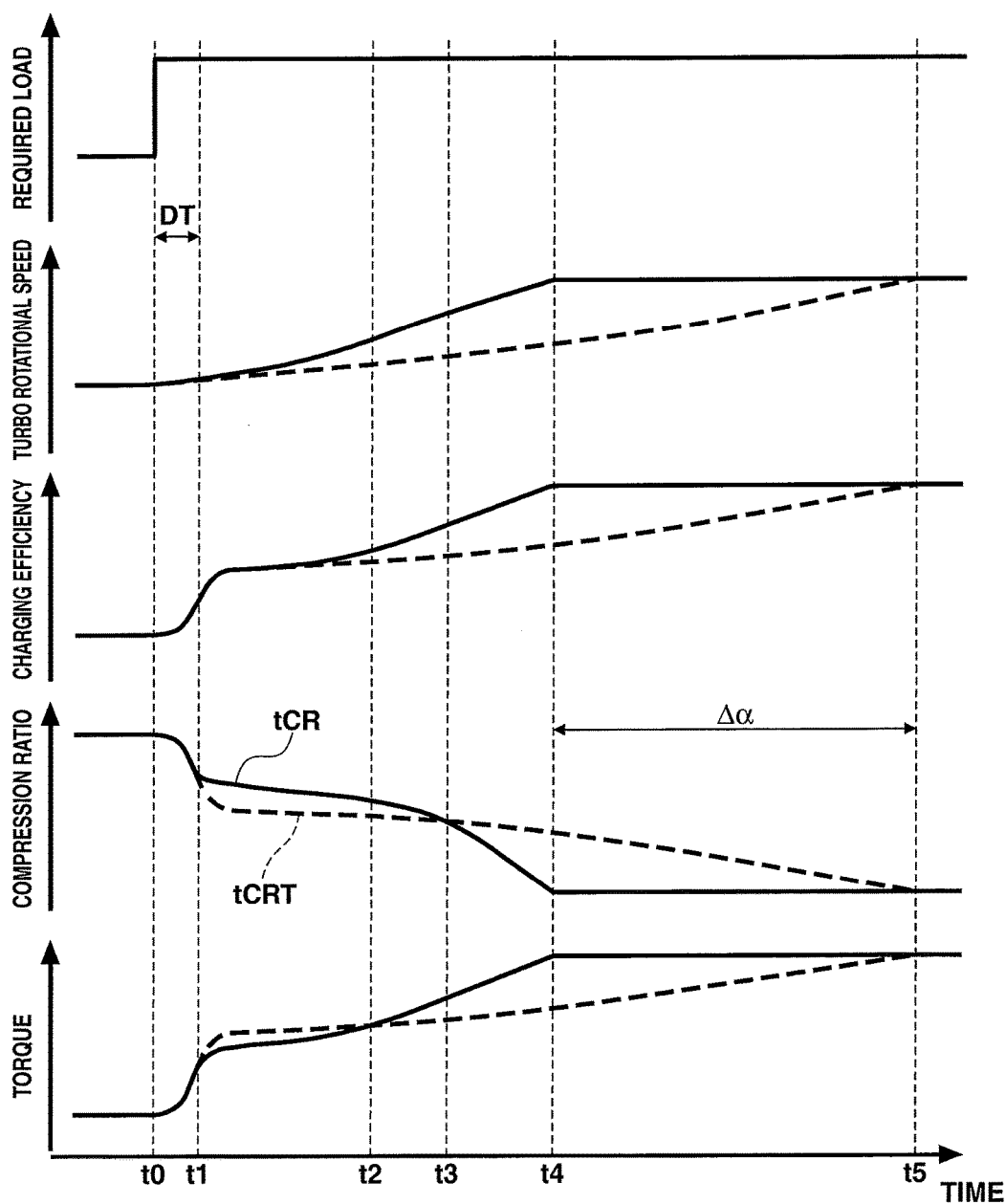
FIG. 6 is a timing chart showing a change in each characteristic value in an acceleration-transient state.

FIG. 6 is the timing chart showing a change in each characteristic value in an acceleration-transient state. In this drawing, the characteristics indicated by the respective solid lines represent characteristics obtained by applying the control of the embodiment by which in an acceleration-transient state a compression ratio is increased and concurrently ignition timing is retarded in comparison with a steady state. On the other hand, the characteristics indicated by the broken lines represent characteristics of the comparative example that a compression ratio and ignition timing are set to a combination of the steady target compression ratio tCRT and ignition timing by which the highest thermal efficiency can be obtained with respect to the required load tT, without applying the control of the embodiment even in an acceleration-transient state.

At the acceleration start point t0 at which required load tT has increased and stepped up depending on a depressing action of the accelerator pedal by the driver, it is determined that an acceleration-transient state with a transition from a non-supercharged state to a supercharged state has started. Thus, the routine of FIG. 5 proceeds from step S4 to step S5. By the way, during the time period from the acceleration start point t0 to the point of time t1 when the previously-discussed delay time DT has expired, the routine of FIG. 5 proceeds from step S11 to step S13, and thus the correction processing of steady target compression ratio tCRT is not executed.

After the point of time t1 at which the delay time DT has expired from the acceleration start point t0, the compression ratio is decreased depending on a rise in real load (torque), but in the present embodiment represented by the characteristic of the solid line the compression ratio is set higher than the comparative example represented by the broken line and concurrently the ignition timing is regarded (although the ignition timing is not shown). Therefore, as compared to the comparative example that carries out such control processing in which a higher priority has been put on a thermal efficiency in a similar manner to a steady state, torque tends to slightly decrease immediately after the acceleration start point t0, but due to an increase in exhaust energy an increase in turbo rotational speed becomes rapid and thus a buildup in supercharging pressure becomes rapid, thereby resulting in a rapid torque increase. Hence, the torque has reversed and becomes higher than that of the comparative example at an earlier time t2.

Thereafter, at a certain point of time t3, the compression ratio obtained by the control of the comparative example and the compression ratio obtained by the control of the embodiment become identical to each other. At the point of time t3, the charging efficiency obtained by the control of the embodiment becomes higher and thus the engine is operating at higher load (torque), and, therefore, even in the case of execution of the control by which the compression ratio is increased, the compression ratio becomes the same compression ratio as the comparative example. The point of time t4 is the timing at which the actual load (real load) reaches the required load by the control of the embodiment, whereas the point of time t5 is the timing at which the actual load (real load) reaches the required load by the control of the comparative example. Therefore, as compared to the comparative example that carries out the control similar to the steady state, it is possible to shorten the elapsed time before the required load has been reached in the acceleration-transient state by a time length Δα from the time t4 to the time t5, by the use of the control of the embodiment.

In this manner, in the shown embodiment, in a transient state from a non-supercharged state to a supercharged state, occurring owing to a rise in required load, a compression ratio is increased and concurrently ignition timing is retarded in comparison with a steady state, and hence it is possible to suppress a delay of response to a rise in supercharging pressure, commonly called "turbo lag", while suppressing a decrease in torque.

In calculating the compression-ratio correction quantity ΔCR at step S10 of FIG. 5, as discussed previously, the compression-ratio correction quantity ΔCR, corresponding to the difference between the transient-state compression ratio and the steady-state compression ratio, increases, as the engine rotational speed Ne decreases. Hence, on one hand, during low-speed operation in which the turbo lag is apt to generally lengthen, it is possible to effectively reduce the turbo lag by increasing the compression-ratio correction quantity ΔCR. On the other hand, during high-speed operation in which the turbo lag is short, it is possible to suppress a decrease in torque during the turbo-lag period by decreasing the compression-ratio correction quantity ΔCR.

Furthermore, the compression-ratio correction quantity ΔCR, corresponding to the difference between the transient-state compression ratio and the steady-state compression ratio, increases, as the difference ΔT between the required load and the real load at the point of time t0, at which a rise in the required load has occurred with a transition to a supercharged state, increases. Hence, on one hand, in a situation where the difference between the required load and the real load is large and thus the turbo lag tends to lengthen, it is possible to provide a sufficient turbo-lag shortening effect by increasing the compression-ratio correction quantity ΔCR. On the other hand, in a situation where the difference between the required load and the real load is small, it is possible to improve the drivability immediately after vehicle acceleration has been started, while suppressing a decrease in torque.

Additionally, the compression-ratio correction quantity ΔCR, corresponding to the difference between the transient-state compression ratio and the steady-state compression ratio, decreases, as the turbo rotational speed Nt of turbocharger 21 increases. Hence, for instance, in the case that the required load temporarily drops after high-load operation has continued and thereafter the required load rises soon, that is, in a situation where turbocharger 21 has continued rotating at high rotational speeds due to its inertia and thus the turbo lag is hard to occur, it is possible to suppress a decrease in torque at the initial stage of the acceleration-transient state by decreasing the compression-ratio correction quantity ΔCR and by bringing the compression ratio closer to the steady-state compression ratio. By the way, in the shown embodiment, the system is configured such that the turbo rotational speed of turbocharger 21 is detected directly by means of the turbo rotational speed sensor 54. More simply, the system is configured such that the turbo rotational speed may be estimated from the supercharging pressure without using such a sensor.

The given delay time DT is provided during the time period from the point of time t0 at which a rise in required load has occurred, that is, the acceleration start point t0 from a non-supercharged state where supercharging is not yet initiated to a supercharged state to the point of time t1 at which correction processing is initiated such that the compression ratio is corrected to a higher compression ratio and concurrently the ignition timing is corrected to a retarded timing value in comparison with the setting in the steady state. Hence, immediately after the acceleration start point t0, that is, at the initial stage of a rise in load, in other words, during a time period in which the intake air downstream of the throttle valve 29 is compressed and thus the intake-air temperature begins to rise, it is possible to avoid the compression ratio from rapidly increasing, thus suppressing the occurrence of knocking.

Furthermore, the time period, in which the intake air downstream of the throttle valve 29 is compressed and thus the intake-air temperature rises, shortens, as the engine rotational speed Ne increases. Hence, by shortening the previously-discussed delay time DT as the engine rotational speed Ne increases, it is possible to initiate the correction control processing early by virtue of the delay time DT shortened depending on the engine rotational speed Ne with no occurrence of knocking.

Also, at step S8 of FIG. 5, when the intake-air temperature is higher than a predetermined temperature value, the correction control processing, by which the compression ratio is corrected to a higher compression ratio and concurrently the ignition timing is corrected to a retarded timing value in the acceleration-transient state, is inhibited. Thus, it is possible to certainly avoid the occurrence of knocking in a high intake-air temperature state and unstable combustion occurring owing to excessively retarded ignition timing.

Furthermore, at step S9 of FIG. 5, when the coolant temperature, serving as the engine temperature, is higher than a predetermined temperature value, the correction control processing, by which the compression ratio is corrected to a higher compression ratio and concurrently the ignition timing is corrected to a retarded timing value in the acceleration-transient state, is inhibited. Thus, it is possible to certainly avoid the occurrence of knocking in a high engine temperature state and unstable combustion occurring owing to excessively retarded ignition timing.

The invention claimed is:

1. An internal-combustion engine control device employing a variable compression ratio means for changing an engine compression ratio of an internal combustion engine and a turbocharger driven by exhaust gas of the internal combustion engine for supercharging intake air, comprising:
   an ignition device for spark-igniting a mixture in each combustion chamber of the internal combustion engine;
   a control means for controlling the engine compression ratio and ignition timing based on at least a required load of the internal combustion engine; and
   the control means configured to:
   execute a steady-state control mode that sets the engine compression ratio to a steady-state engine compression ratio (εm) and sets the ignition timing to steady-state ignition timing (Tm) in a prescribed steady state; and
   execute an acceleration-transient-state control mode that corrects the engine compression ratio to a higher compression ratio and concurrently corrects the ignition timing to a retarded timing value in a transient state from a non-supercharged state to a supercharged state, occurring owing to a rise in the required load, in comparison with the steady-state engine compression ratio and the steady-state ignition timing during steady-state operation for a same required load.

2. An internal-combustion engine control device as recited in claim 1, wherein:
   the control means is configured to increase a difference between the transient-state engine compression ratio and the steady-state engine compression ratio, as an engine rotational speed decreases.

3. An internal-combustion engine control device as recited in claim 1, wherein:
   the control means is configured to increase a difference between the transient-state engine compression ratio and the steady-state engine compression ratio, as a difference between the required load and a real load increases.

4. An internal-combustion engine control device as recited in claim 1, further comprising a means for measuring or estimating a turbo rotational speed of the turbocharger, wherein:
the control means is configured to decrease a difference between the transient-state engine compression ratio and the steady-state engine compression ratio, as the turbo rotational speed increases.

5. An internal-combustion engine control device as recited in claim 1, wherein:
the control means is configured to:
correct the engine compression ratio to the higher compression ratio and concurrently correct the ignition timing to the retarded timing value, after a given delay time has expired from an acceleration start point from the non-supercharged state to the supercharged state.

6. An internal-combustion engine control device as recited in claim 5, wherein:
the control means is configured to shorten the delay time, as an engine rotational speed increases.

7. An internal-combustion engine control device as recited in claim 1, further comprising a means for measuring or estimating an intake-air temperature, wherein:
the control means is configured to inhibit correction processing for both the engine compression ratio and the ignition timing even in the transient state, when the intake-air temperature is higher than a predetermined temperature.

8. An internal-combustion engine control device as recited in claim 1, further comprising a means for measuring or estimating an engine temperature, wherein:
the control means is configured to inhibit correction processing for both the engine compression ratio and the ignition timing even in the transient state, when the engine temperature is higher than a predetermined temperature.

9. A method of controlling an internal combustion engine employing a variable compression ratio means for changing an engine compression ratio of the internal combustion engine, a turbocharger driven by exhaust gas of the internal combustion engine for supercharging intake air, and an ignition device for spark-igniting a mixture in each combustion chamber of the internal combustion engine, comprising:
controlling, in a prescribed steady state, the engine compression ratio and ignition timing to a steady-state engine compression ratio and steady-state ignition timing; and
correcting the engine compression ratio to a higher compression ratio and concurrently correcting the ignition timing to a retarded timing value in a transient state from a non-supercharged state to a supercharged state, occurring owing to a rise in required load, in comparison with the steady-state engine compression ratio and the steady-state ignition timing during steady-state operation for a same required load.

10. An internal-combustion engine control device employing a variable compression ratio mechanism for changing an engine compression ratio of an internal combustion engine and a turbocharger driven by exhaust gas of the internal combustion engine for supercharging intake air, comprising:
an ignition device for spark-igniting a mixture in each combustion chamber of the internal combustion engine; and
a control unit configured to:
control the engine compression ratio and ignition timing based on at least a required load of the internal combustion engine;
execute a steady-state control mode that sets the engine compression ratio to a steady-state engine compression ratio and sets the ignition timing to steady-state ignition timing in a prescribed steady state; and
execute an acceleration-transient-state control mode that corrects the engine compression ratio to a higher compression ratio and concurrently corrects the ignition timing to a retarded timing value in a transient state from a non-supercharged state to a supercharged state, occurring owing to a rise in the required load, in comparison with the steady-state engine compression ratio and the steady-state ignition timing during steady-state operation for a same required load.

11. An internal-combustion engine control device as recited in claim 10, wherein:
the control unit is configured to increase a difference between the transient-state engine compression ratio and the steady-state engine compression ratio, as an engine rotational speed decreases.

12. An internal-combustion engine control device as recited in claim 10, wherein:
the control unit is configured to increase a difference between the transient-state engine compression ratio and the steady-state engine compression ratio, as a difference between the required load and a real load increases.

13. An internal-combustion engine control device as recited in claim 10, further comprising a device configured to measure or estimate a turbo rotational speed of the turbocharger, wherein:
the control unit is configured to decrease a difference between the transient-state engine compression ratio and the steady-state engine compression ratio, as the turbo rotational speed increases.

14. An internal-combustion engine control device as recited in claim 10, wherein:
the control unit is configured to:
correct the engine compression ratio to the higher compression ratio and concurrently correct the ignition timing to the retarded timing value, after a given delay time has expired from an acceleration start point from the non-supercharged state to the supercharged state.

15. An internal-combustion engine control device as recited in claim 14, wherein:
the control unit is configured to shorten the delay time, as an engine rotational speed increases.

16. An internal-combustion engine control device as recited in claim 10, further comprising a device configured to measure or estimate an intake-air temperature, wherein:
the control unit is configured to inhibit correction processing for both the engine compression ratio and the ignition timing even in the transient state, when the intake-air temperature is higher than a predetermined temperature.

17. An internal-combustion engine control device as recited in claim 10, further comprising a device configured to measure or estimate an engine temperature, wherein:
the control unit is configured to inhibit correction processing for both the engine compression ratio and the ignition timing even in the transient state, when the engine temperature is higher than a predetermined temperature.

18. A method of controlling an internal combustion engine employing a variable compression ratio mechanism for changing an engine compression ratio of the internal combustion engine, a turbocharger driven by exhaust gas of the internal combustion engine for supercharging intake air, and an ignition device for spark-igniting a mixture in each combustion chamber of the internal combustion engine, comprising:

controlling, in a prescribed steady state, the engine compression ratio and ignition timing to a steady-state compression ratio and steady-state ignition timing; and correcting the engine compression ratio to a higher compression ratio and concurrently correcting the ignition timing to a retarded timing value in a transient state from a non-supercharged state to a supercharged state, occurring owing to a rise in required load, in comparison with the steady-state engine compression ratio and the steady-state ignition timing during steady-state operation for a same required load.

\* \* \* \* \*